United States Patent [19]
Koponen et al.

[11] Patent Number: 5,551,056
[45] Date of Patent: Aug. 27, 1996

[54] METHOD FOR SECURING THE OPERATION OF A TELECOMMUNICATIONS NETWORK IN A CELLULAR RADIO SYSTEM AND A BASE STATION ARRANGEMENT

[75] Inventors: Pekka Koponen; Jukka Suonvieri, both of Oulu, Finland

[73] Assignee: Nokia Telecommunications Oy, Espoo, Finland

[21] Appl. No.: 291,598

[22] Filed: Aug. 16, 1994

[30] Foreign Application Priority Data

Aug. 17, 1993 [FI] Finland .................................. 933630

[51] Int. Cl.⁶ .................................................. H04B 3/36
[52] U.S. Cl. .................. 455/8; 455/9; 455/54.1
[58] Field of Search ................... 455/8, 9, 54.1, 455/56.1, 33.1, 67.1; 379/59; 371/20.2

[56] References Cited

U.S. PATENT DOCUMENTS

| | | | |
|---|---|---|---|
| 2,597,043 | 5/1952 | Treadwell | 455/8 |
| 2,699,495 | 1/1955 | Magnuski et al. | 455/8 |
| 4,039,947 | 8/1977 | Miedema | 455/8 |
| 4,949,340 | 8/1990 | Smith et al. | 455/9 |
| 5,187,808 | 2/1993 | Thompson | 455/8 |
| 5,384,824 | 1/1995 | Alvesalo | 455/33.1 |

FOREIGN PATENT DOCUMENTS

| | | |
|---|---|---|
| 0163311 | 12/1985 | European Pat. Off. . |
| 280543 | 8/1988 | European Pat. Off. . |
| 672931 | 5/1952 | United Kingdom . |
| 2262412 | 6/1993 | United Kingdom . |

OTHER PUBLICATIONS

Hill, Microwave Engineering Europe, "The design of a GSM base-station tuneable combiner", Oct. 1992, pp. 57-58, 61-62 & 65.

Primary Examiner—Reinhard J. Eisenzopf
Assistant Examiner—Marsha D. Banks-Harold
Attorney, Agent, or Firm—Cushman Darby & Cushman, L.L.P.

[57] ABSTRACT

A method for securing the operation of a telecommunications network in a cellular radio system, in which telecommunications network base stations are connected in series in such a way that at least one base station serves as a repeater for telecommunication signals of preceding base stations. For securing the operation of the telecommunications network, the base station is provided with a control unit monitoring its operation and with a repeater connected in parallel with the base station, the repeater having a power source independent of the base station. When the control unit detects a failure at the base station, the signals to be transmitted in the telecommunications network are directed to the repeater which transmits them further in the telecommunications network.

6 Claims, 2 Drawing Sheets

METHOD FOR SECURING THE OPERATION OF A TELECOMMUNICATIONS NETWORK IN A CELLULAR RADIO SYSTEM AND A BASE STATION ARRANGEMENT

BACKGROUND OF THE INVENTION

The present invention relates to a method for securing the operation of a telecommunications network in a cellular radio system, in which telecommunications network base stations are connected in series in such a way that at least one base station serves as a repeater for telecommunication signals of preceding base stations. The invention further relates to a base station arrangement in a cellular radio system, comprising means by which the base station can establish a radio connection with active-radio units currently located within its predetermined radio coverage area, and means by which the base station can repeat signals transmitted by other base stations in the telecommunications network interconnecting them.

Previously known are telecommunications networks for cellular radio systems in which base stations are connected in series in such a way that a base station in the network serves as a repeater for telecommunication signals from preceding base stations. In such a prior art telecommunications network, data transmission between the base stations is secured by way of galvanic relay connections. When a base station in the network ceases to operate on account of a mains disturbance, for instance, thereby also ceasing to regenerate the telecommunication signals from preceding base stations, a relay incorporated in the base station disconnects the base station from the telecommunications network in such a manner that the base station is bypassed by way of a galvanic connection.

The most significant drawback of the above prior art telecommunications network is that it cannot compensate for attenuation of the signal level brought about by the network cabling. This attenuation and disturbance induced by the network can be significant, since comparatively lengthy transmission cables must often be employed in telecommunications networks of cellular radio systems on account of the wide geographic area covered by the network. Consequently, there is a danger that if a base station forming part of the network ceases to operate and is thereby rendered incapable of regenerating signals delivered by preceding base stations in the network, the operation of the entire telecommunications network ceases, as its cabling attenuates the level of the transmitted signals too much for the base station that is next to the failed base station in the network to be able to identify the signals supplied. In other words, a blackout is created in the network at the failed base station. The signal level is further affected by the above-mentioned galvanic connection, which may cause considerable attenuation.

SUMMARY OF THE INVENTION

It is an object of the present invention to resolve the above difficulties and to provide a method and a base station arrangement by way of which the effect of a base station failure in a telecommunications network can be minimized so that the remaining telecommunications network can be maintained operative. These objects are achieved with the method of the invention, which is characterized in that the base station is provided with a control unit monitoring its operation and with a repeater connected in parallel with the base station, said repeater having a power source independent of the base station, and that when the control unit detects a failure at the base station, the signals to be transmitted in the telecommunications network are directed to the repeater which transmits them further in the telecommunications network.

The invention further relates to a base station arrangement, which is characterized in that the arrangement comprises a repeater connected in parallel with the base station, said repeater having a power source independent of the base station, and a control unit monitoring the operation of the base station, said control unit enabling, in the event of a failure at the base station, said repeater which regenerates signals to be transmitted in the telecommunications network and transmits them further in said telecommunications network.

The invention is based on the idea that the reliability of a telecommunications network in a cellular radio system is decisively improved when the base stations are provided with separate, functionally independent repeaters by way of which signals in the telecommunications network can be repeated when a failure occurs at a base station in the network. Thus it is ensured that the signals to be transmitted in the network can be identified even when one of the base stations in the network is inoperative. The most significant advantage of the method and base station arrangement of the invention is that the operation of the network can be reliably secured in situations where the distance between the base stations is great, the transmission cables between the base stations are lengthy and hence the cables significantly attenuate the signal level of signals passing through them. Thus a breakdown at a failed base station only affects the cell of the base station in question.

BRIEF DESCRIPTION OF THE DRAWINGS

The invention will now be more closely explained by means of a few preferred embodiments with reference to the accompanying drawings, in which.

DETAILED DESCRIPTION OF THE INVENTION

Figure 1:
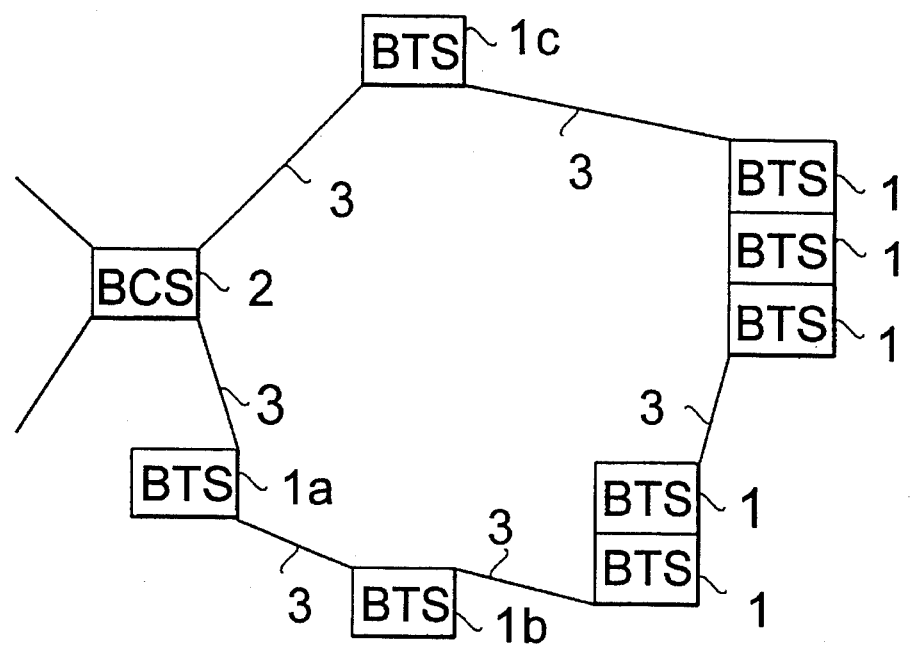
FIG. 1 is a schematic view of a part of a telecommunications network in a cellular radio system.

FIG. 1 is a schematic view of a part of a telecommunications network in a cellular radio system, such as a telecommunications network in the GSM system (Global System for Mobile Communications), in which the method according to the invention can be applied. The figure shows eight cellular radio system base stations (BTS) 1, 1a, 1b and 1c and a base station controller (BSC) 2. The base stations and base station controller are interconnected by way of cables 3. The data transmission rate of the cables 3 shown in FIG. 1 is 2 Mbits, for instance.

As will be seen from FIG. 1, the base stations are chained, i.e. connected in series in such a manner that the telecommunication signals of a preceding base station in the telecommunications network are transmitted through the subsequent base stations. For example, the telecommunication signals between the base station 1b and the base station controller 2 are directed via the base station 1a by way of cables 3. The base station 1a thus functions as a repeater for the signals of the base station 1b, for instance, and receives the signals transmitted by the base station 1b, whereafter it regenerates them and transmits them further to the base station controller 2. Hence the attenuation caused by the cables 3 can be compensated for.

It is obvious that if a failure is induced at any of the base stations shown in FIG. 1, the failure hinders the operation of the entire telecommunications network, and in the worst case may even make the entire network totally inoperative. It is apparent from FIG. 1 that the entire part of a telecommunications network shown is fully inoperative if for example the base stations 1a and 1c simultaneously develop a failure that prevents them from repeating signals from other base stations to the base station controller 2.

Figure 2:
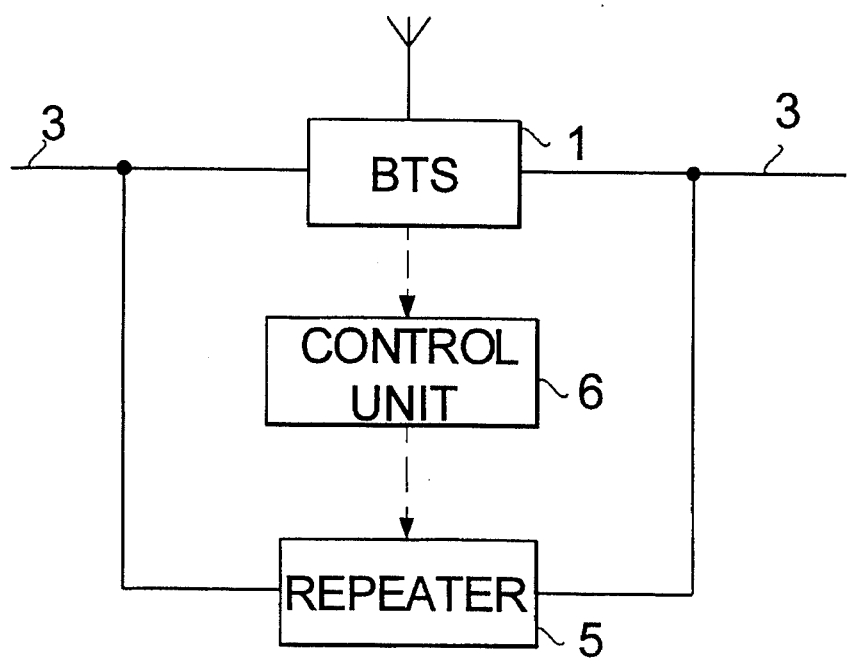
FIG. 2 is a block diagram of a first preferred embodiment of a base station arrangement according to the invention.

FIG. 2 shows a block diagram of a preferred embodiment of a base station arrangement according to the invention. FIG. 2 shows at reference numeral 1 a prior art base station (BTS) comprising means by which the base station can establish a radio connection with radio units within its coverage area, and means by which the base station can repeat telecommunication signals sent by other base stations and transmitted over the cables 3.

It is to be seen from FIG. 2 that the base station arrangement of the invention includes a repeater 5 connected to the telecommunications network in parallel with the prior art base station 1, and a control unit 6 in connection with the repeater. During normal operation of the base station 1, the repeater 5 is in waiting mode and does not influence the operation of the base station or the telecommunications network. The control unit 6 monitors the operation of the base station 1 constantly. When the control unit 6 detects a failure in the operation of the base station 1, on account of e.g. a mains disturbance, it enables the repeater 5. The repeater 5, which is provided with battery backup, is fully independent of the operation of the base station and is thus capable of operating during a mains disturbance, for example. Enabling of the repeater 5 causes the signals transmitted in the telecommunications network to be led past the failed base station 1 by way of the repeater 5. In other words, the base station 1 is replaced by the repeater on the hot standby principle, and thus the repeater 5 is in a state of constant readiness and there are no delays in connection with its enabling. Hereby it is secured that the signal level of the signals transmitted in the telecommunications network is not lowered on account of the attenuation from the transmission cables 3 to such an extent that the base station which follows the failed base station in the network is no longer capable of identifying the signals transmitted. Thus the breakdown only affects the radio cell of the failed base station.

Figure 3:
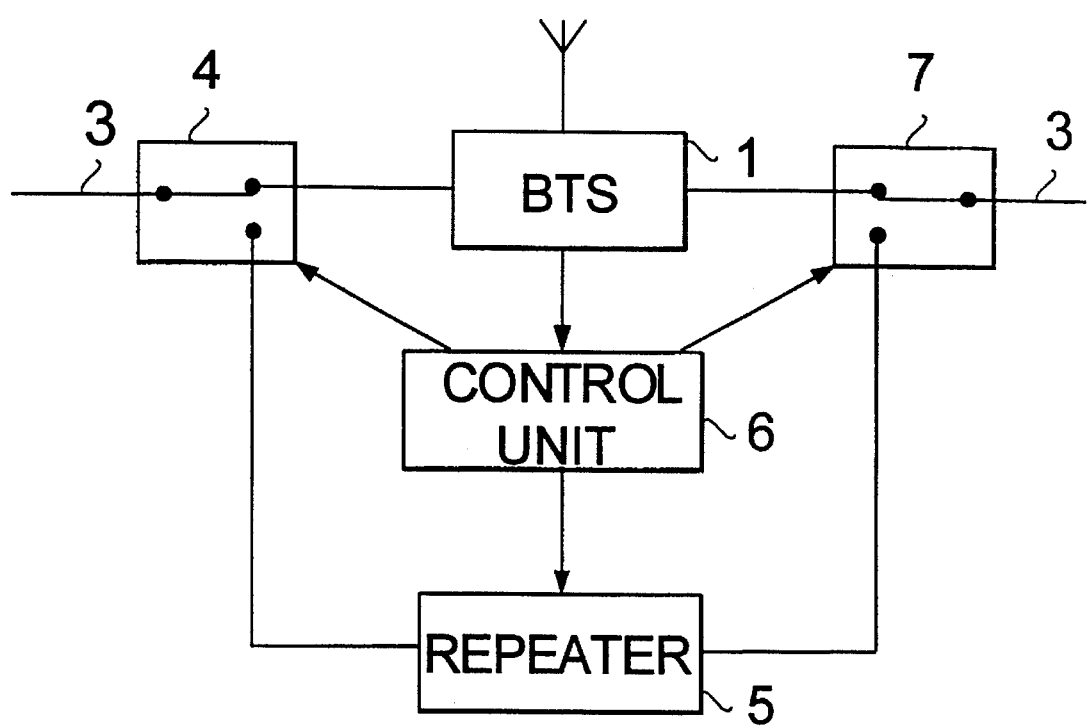
FIG. 3 is a block diagram of another preferred embodiment of the base station arrangement according to the invention.

FIG. 3 is a block diagram of another preferred embodiment of the base station arrangement according to the invention. The arrangement shown in FIG. 3 is very similar to that of FIG. 2. In the embodiment of FIG. 3, however, the base station 1 incorporates switches 4 and 7 by way of which the control unit disconnects the base station 1 totally from the telecommunications network in the event of a failure. When disconnecting the base station from the network, the switches 4 and 7 connect the repeater 5 to the network, and thus normal operation of the network can be resumed.

It will be appreciated that the above description and the figures relating thereto are only intended to illustrate a few preferred embodiments according to the invention, without limiting the actual invention. Thus preferred embodiments of the method and base station arrangement according to the invention may vary within the scope of the appended claims.

We claim:

1. A base station arrangement in a cellular radio system, comprising:

a base station having a predetermined coverage area, said base station comprising first means by which the base station can establish a radio connection with active radio units currently located within said predetermined radio coverage area, and second means for receiving signals transmitted by other base stations through a first cabled communication link, for repeating said signals and for transmitting said repeated signals further via a second cabled communication link;

a control unit monitoring operation of said base station; and a repeater connected in parallel with said base station, said repeater being responsive to said control unit for repeating signals received from said first cabled communication link for transmitting further said repeated signals via said second cabled communication link when said control unit indicates a malfunction of said base station.

2. An arrangement as claimed in claim 1, further comprising:

switching means being responsive to said control unit for disconnecting said base station from said first and second cabled communication links.

3. A base station arrangement as claimed in claim 1, wherein:

said repeater has a power course which is independent of the base station and is a battery.

4. A base station arrangement as claimed in claim 1, wherein said base station is a GSM base station.

5. A communication network of a cellular radio system, comprising:

first, second and third base stations each having a respective coverage area;

a first cabled communication link interconnecting said first base station with said second base station;

a second cabled communication link interconnecting said first base station with said third base station, said first base station comprising first means for providing radio communication with radio units within its coverage area, and second means for repeating signals received from said first cabled communication link and for transmitting said repeated signals further via said second cabled communication link;

a control unit monitoring operation of the first base station; and a repeater having an input connected to said first cabled communication link and an output connected to said second cabled communication link and being responsive to said control unit for repeating signals received from said first cabled communication link and for transmitting further said repeated signals via said second cabled communication link when said control unit indicates a malfunction of said first base station.

6. A communication network of a cellular radio system, comprising:

first and second base stations each having a respective coverage area;

a base station controller;

a first cabled communication link interconnecting said first base station with said second base station;

a second cabled communication link interconnecting said first base station with said base station controller;

said first base station comprising first means for providing radio communication with radio units within its coverage area, and second means for repeating signals received from said first cabled communication link and for transmitting said repeated signals further via said second cabled communication link;

a control unit monitoring the operation of the first base station; and a repeater having an input connected to said first cabled communication link and an output connected to said second cabled communication link and being responsive to said control unit for repeating signals received from said first cabled communication link and for transmitting further said repeated signals via said second cabled communication link when said control unit indicates a malfunction of said first base station.

* * * * *